United States Patent [19]

Jabusch

[11] Patent Number: 5,271,578
[45] Date of Patent: Dec. 21, 1993

[54] SELF-LOCKING REELING DEVICE FOR A SAFETY BELT WITH RETRACTOR SWITCHING

[75] Inventor: Ronald Jabusch, Elmshorn, Fed. Rep. of Germany

[73] Assignee: Autoflug GmbH & Co. Fahrzeugtechnik, Rellingen, Fed. Rep. of Germany

[21] Appl. No.: 956,718

[22] Filed: Oct. 2, 1992

[30] Foreign Application Priority Data

Oct. 3, 1991 [DE] Fed. Rep. of Germany ....... 4132876

[51] Int. Cl.$^5$ .................... B60P 22/38; B60R 22/40
[52] U.S. Cl. .................... 242/107.4 R; 242/107.4 A
[58] Field of Search ................ 242/107.4 R, 107.4 A, 242/107.4 B, 107.4 D; 280/806; 297/478, 480

[56] References Cited

U.S. PATENT DOCUMENTS

| | | | |
|---|---|---|---|
| 4,566,649 | 1/1986 | Petersen | 242/107.4 A |
| 4,729,524 | 3/1988 | Befort et al. | 242/107.4 A |
| 4,747,562 | 5/1988 | Tsukamoto | 242/107.4 A X |
| 4,749,143 | 6/1988 | Tsukamoto et al. | 242/107.4 A |
| 4,811,912 | 3/1989 | Takada | 242/107.4 R |

FOREIGN PATENT DOCUMENTS

| | | |
|---|---|---|
| 7425531 | 7/1974 | Fed. Rep. of Germany . |
| 3036412 | 9/1980 | Fed. Rep. of Germany . |
| 3809007 | 3/1988 | Fed. Rep. of Germany . |

Primary Examiner—John M. Jillions
Attorney, Agent, or Firm—Robert W. Becker & Associates

[57] ABSTRACT

For a self-locking reeling device for a safety belt, especially for motorized vehicles, with a vehicle-sensitive and/or belt-sensitive control system for the locking member, the switching point of the locking device is exactly determined. The locking device consists of a rocker arm with a switching arm which when, the safety belt is removed from the reel to a predetermined unwinding stage, engages the outer toothing of the control disk of the belt-sensitive and/or vehicle-sensitive control system and which, when the safety belt is rewound onto the reel, is in a release position for the control disk. The rocker arm is pivotably arranged about the axis of the reeling shaft and both ends have gear wheels that intermesh with a further gear wheel fixedly connected to the reeling shaft. The gear wheel that is fixedly connected to the reeling shaft as well as the gear wheels connected to the rocker arm are each provided with switching lugs which at the predetermined unwinding stage of the safety belt engage one another and pivot the rocker arm due to a pulling force of the safety belt or the winding spring.

5 Claims, 2 Drawing Sheets

SELF-LOCKING REELING DEVICE FOR A SAFETY BELT WITH RETRACTOR SWITCHING

BACKGROUND OF THE INVENTION

The present invention relates to a selflocking reeling device for a safety belt, especially for motor vehicles, having a vehiclesensitive and/or belt-sensitive control system for a blocking member which in the case of an emergency situation prevents the further rotation of the reeling shaft. The device further comprises a winding spring acting on the reeling shaft. A Locking device pivots a switching arm into the outer toothing of a control disk when the belt has been removed from the reel to a desired extent and disengages the switching arm from the outer toothing for releasing the control disk when the safety belt is wound onto the reel. The locking device comprises a gear wheel with a switching lug or control lug that intermeshes with a gear wheel fixedly connected to the reeling shaft and also a rocker arm connected in a pivotable manner to the housing of the reeling device for controlling the switching arm.

A safety belt reeling device of the aforementioned kind is known from German patent 38 09 007. For controlling a respective locking arm a two-prong actuation lever that is pivotable about an axis is provided which is controlled by a planetary toothed gear wheel system which acts on two lugs which are slidable within respective guides provided at the housing. The planetary gear wheel system is comprised of a central gear wheel which is connected to the shaft of the reeling device and a coordinated hollow wheel. Both are engaged by a planetary gear wheel that upon winding movements of the reeling shaft rotates about its own axis as well as circles about the central gear wheel upon rotation of the central gear wheel in accordance with the rotation of the reeling shaft. The planetary gear wheel is provided with a projection that is axially displaced relative to its toothing with which it acts on the slidable lugs for activating the actuation lever.

The known reeling device has the disadvantage that the design and construction of the disclosed locking device for switching the reeling device, including the arrangement of the actuation lever and the coordination of the expensive planetary gear wheel system, is comprised of a plurality of components and is therefore expensive to manufacture and assemble because the individual parts must conform to high precision standards in order to ensure a secure functioning of the reeling device.

It is therefore an object of the present invention to provide a reeling device of the aforementioned kind having a simplified locking device.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
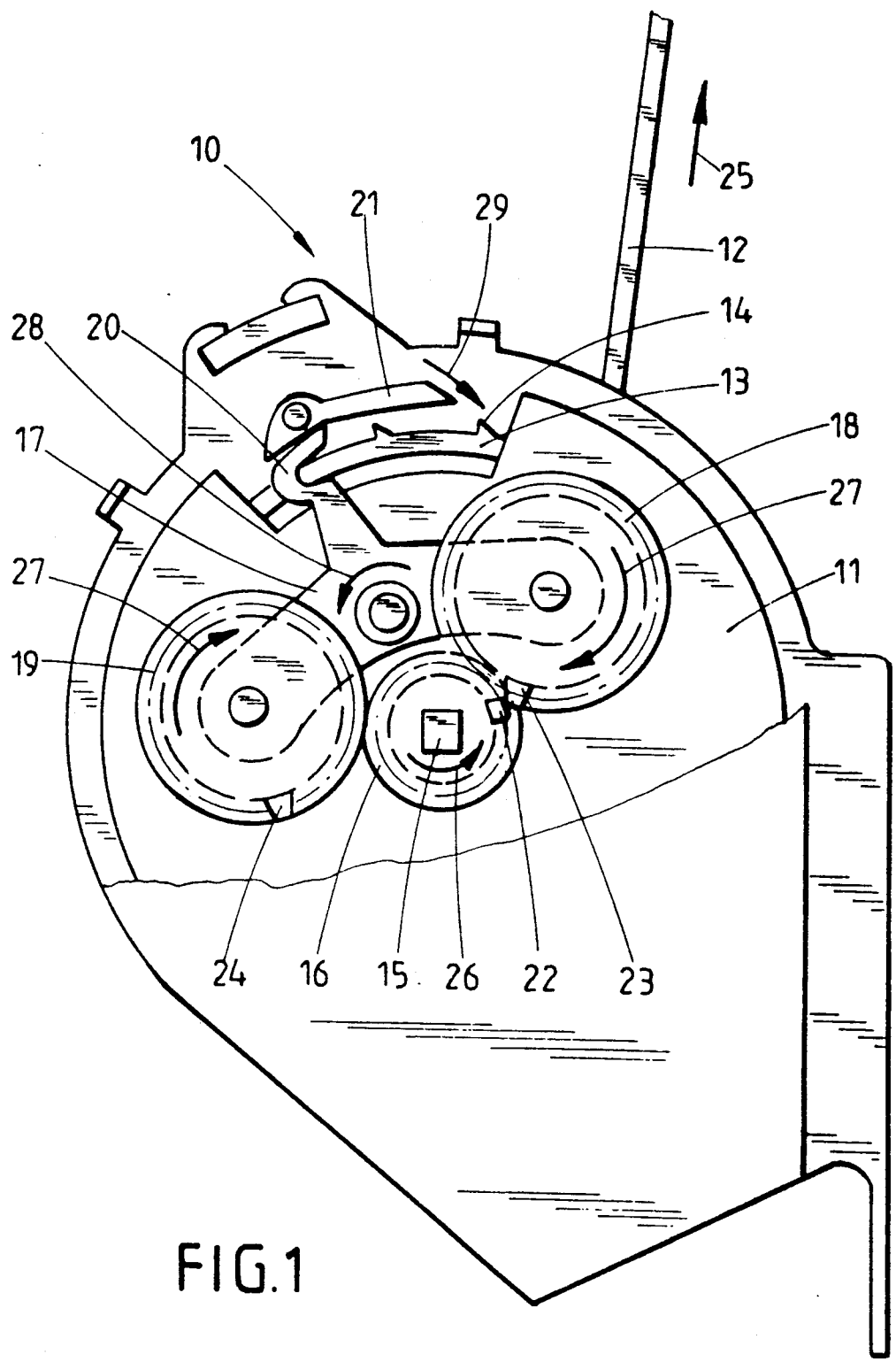
FIG. 1 is a schematic representation of the essential functioning portions of the locking device required for activating of the locking step, at a stage shortly before the actual activation.

The self-locking reeling device of the present invention is primarily characterized by:

A housing and a reeling shaft connected within the housing;

A reel for the safety belt connected to the reeling shaft;

A winding spring acting on the reeling shaft;

A first gear wheel fixedly connected to the reeling shaft:

A belt-sensitive and vehicle-sensitive control system for blocking the reeling device, the control system including a control disk with an outer toothing;

A locking device having a switching arm for locking the control disk when the safety belt has been removed from the reel to a predetermined unwinding stage and for releasing the control disk when the safety belt is rewound onto the reel, the locking device including a rocker arm connected to the housing;

The rocker arm pivotably connected to the housing such that the rocker arm pivots about an axis of the reeling shaft for controlling the switching arm, the rocker arm having a first and a second end and comprising a second gear wheel connected to the first end and a third gear wheel connected to the second end;

The second gear wheel and the third wheel meshing with the first gear wheel; and Each one of the first, second, third gear wheels comprises a switching lug which at the predetermined unwinding stage of the safety belt engage one another and pivot the rocker arm due to a pulling force of the safety belt or the winding spring.

Preferably, the switching lugs of the gear wheels are positioned outside of a plane of toothing of the gear wheels. Advantageously between the first gear wheel and the second and third gear wheels enough play is provided so that the rocker arm can pivot freely.

In a further embodiment of the present invention, the inventive reeling device further comprises a locking arm cooperating with the switching arm such that the locking arm engages the toothing of the control disk for locking the control disk. Preferably, the locking arm is a spring arm that is loaded in the direction of engagement with the toothing.

According to the present invention, the rocker arm is pivotable about the axis of the reeling shaft and both ends are provided with gear wheels that intermesh with the gear wheel that is fixedly connected to the reeling shaft. Each one of the gear wheels is provided with a respective switching Lug which at a predetermined stage of unwinding of the safety belt come into contact with one another and initiate a pivoting of the rocker arm. This inventive solution is advantageous because in a simple manner the number of revolutions performed by the reeling shaft may serve as a simple indicator for switching on or off the looking mechanism of the reeling device. Accordingly, the revolutions of the reeling shaft are directly used to control the switching arm such that the respective coordinated switching lugs of the two gear wheels connected to the rocker arm, on the one hand, and of the gear wheel fixedly connected to the reeling shaft, on the other hand, only come into contact with one another after performing a predetermined number of revolutions in the one or other direction so that the rocker arm is correspondingly moved for actuating the switching arm and a coordinated locking component. i.e. locking arm is introduced into or removed from the outer toothing of the control disk.

According to a further embodiment of the present invention the coordinated switching lugs are arranged outside of the plane of toothing of the gear wheels so that a further rotation of the reeling shaft, respectively, of the coordinated gear wheels, after the abutment of the switching lugs at one another, is possible because the switching lugs, after completion of the pivoting of the rocker arm and the correspondingly ensured switching step, are able to pass one another. A similar suggestion is already known from German Offenlegungsschrift 30 36 412.

According to a further embodiment of the present invention the meshing of the gear wheel fixedly connected to the reeling shaft with the gear wheels connected to the rocker arm must have that much play that the tooth meshing allows the movement or pivoting of the rocker arm which is supported remote from the reeling shaft axis.

The switching arm connected to the rocker arm may in principle directly engage the outer toothing of the control disk. According to one particular embodiment of the present invention, it is also suggested to provide an additional locking component or locking arm at the housing of the reeling device which is controlled by the switching arm of the rocker arm between an engagement position at the outer toothing of the control disk and a release position. Such an additional locking arm which is controlled by the switching arm is also known from the German patent 38 09 007.

Advantageously, the locking arm is in the form of a spring arm which is loaded in the direction of engagement with the outer toothing of the control disk and which upon switching off the locking device is maintained in a release position, i.e., out of engagement with the outer toothing of the control disk.

DESCRIPTION OF PREFERRED EMBODIMENTS

The present invention will now be described in detail with the aid of several specific embodiments utilizing FIGS. 1 and 2.

Figure 2:
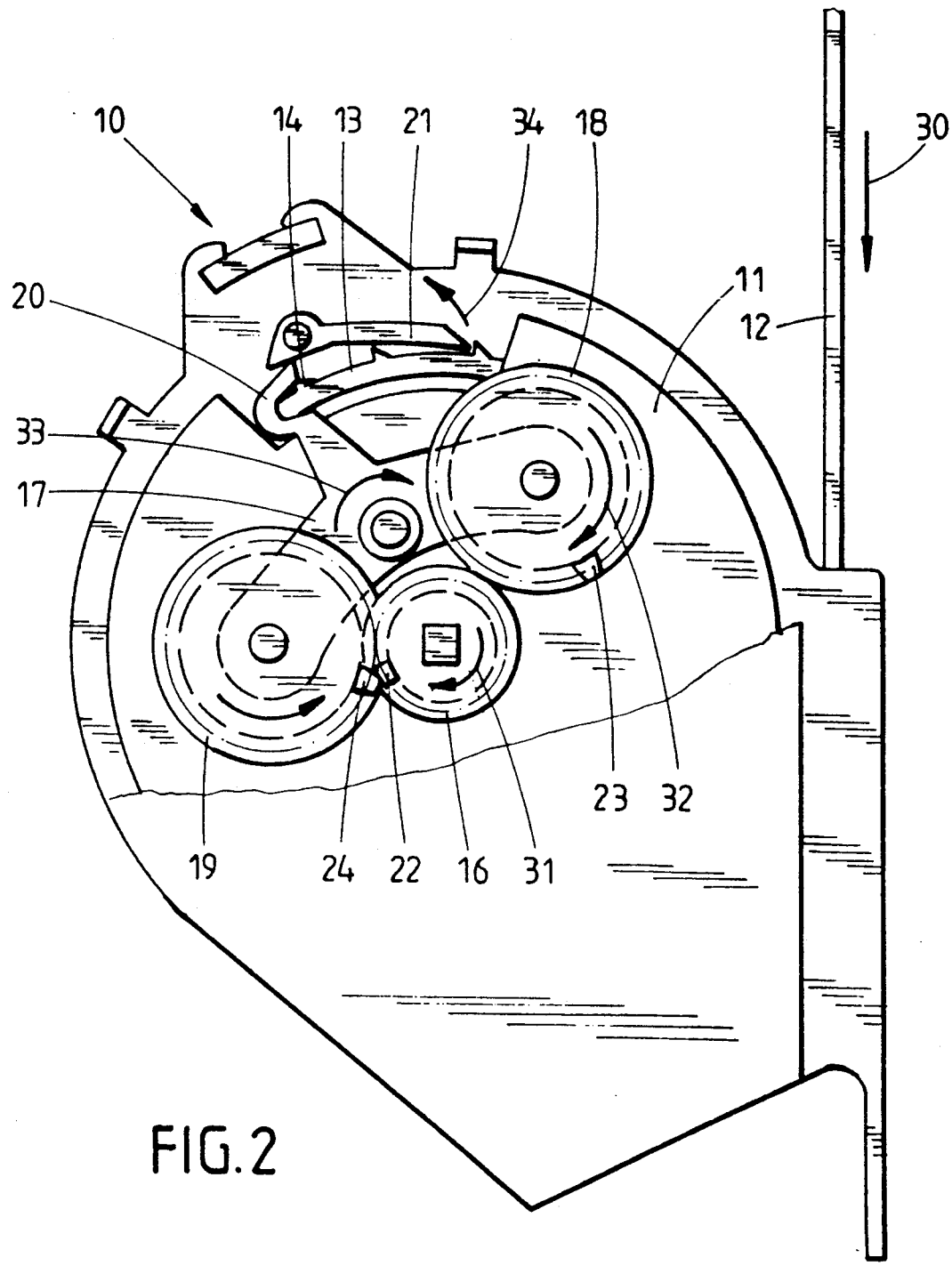
FIG. 2 shows the device according to FIG. 1 in the locked position shortly before deactivation takes place.

FIGS. 1 and 2 show a side view of a self-locking reeling device for a safety belt 10 representing its leg 11 of the U-shaped housing in which a reeling shaft with a reel, not represented in the drawing, with the safety belt 12 wound on the reel is rotatably supported. A winding spring, not represented in the drawing, is also provided at one of the legs of the housing of the self-locking reeling device and is covered by a cover plate. The winding spring acts on the reeling shaft for winding the safety belt. At the other leg of the U-shaped housing, also hidden by a cover plate, the blocking mechanism with the belt-sensitive and/or vehicle-sensitive control system is located. The control disk 13 and outer toothing 14 of the control system is visible in the cutout portion of the drawing FIG. 1 and FIG. 2. The control disk 13 is supported at the reeling shaft and is coupled with a radially pivotable locking member supported at the reeling shaft such that when the control disk 13 is still and the reeling shaft is rotating, a pivoting of the blocking member into its blocking position and thus a blockage of the reeling shaft occurs. Such a blocking system is essentially known from German Gebrauchsmuster 74 25,531.

The reeling shaft has a square projection 15 for supporting in a form-locking manner a gear wheel 16 so that a fixed connection of the gear wheel 16 with the reeling shaft results. A rocker arm 17 is pivotably connected to the leg 11 of the housing of the reeling device and is provided with gear wheels 18, 19 at both outer ends. The pivoting arrangement is designed such that the gear wheels 18, 19 are constantly meshing with the gear wheel 16 fixedly connected to the reeling shaft. The meshing between the gear wheels 16, 18, 19 is designed such that a movement of the rocker arm 17 is possible with constant intermeshing of the gear wheels.

A switching arm 20 extends radially from the rocker arm 17. The free end of the switching arm 20 performs a circular arc-shaped movement upon pivoting of the rocker arm 17. A spring arm 21 is supported at the leg 11 of the housing of the reeling device 10 which due to its spring action is forced in the direction of engagement with the outer toothing 14 of the control disk 13, as represented in FIG. 2. The spring arm 21 is loaded by the switching arm 20 of the rocker arm 17 such that, during normal operation of the reeling device, the spring arm 21 is removed from engagement with the outer toothing 14 of the control desk 13 by the switching arm 20.

The meshing gear wheels 16, 18, 19 are provided with switching lugs in a plane outside of the toothing plane whereby the gear wheel 16 has a switching lug 22, the gear wheel 18 a switching lug 23, and the gear wheel 19 a switching lug 24.

Based on the position shown in FIG. 1, the operation of the locking device will be described in the following.

In the position represented in FIG. 1 the self-locking reeling device functions as a reel with a vehicle-sensitive and belt-sensitive control of its blocking mechanism via control of the control disk, as described in German Gebrauchmuster 74 25 231. When, for example, for attaching a child seat, the safety belt 12 is removed from the reel in the direction of arrow 25, the gear wheel 16 that is fixedly connected to the reeling shaft is rotated in the direction of arrow 26 whereby a load-free actuation of the gear wheels 18, 19 in the direction of rotation of arrow 27 occurs. During this rotation of the gear wheels 16, 18, 19 the corresponding switching lugs 22, 23, 24 do not come into contact but are rotated past one another.

Only when a predetermined number of revolutions of the gear wheel 16 has been reached which corresponds to the predetermined unwinding state of the safety belt 12, the switching lugs 22, 23 of the gear wheels 16, 18 abut at one another such that upon a further loading of the gear wheel 16 in the direction of rotation 26 the rocker arm 17 is pivoted in the direction of arrow 28. Due to this pivoting the switching arm 20 is removed from its engagement with the spring arm 21 so that due to its spring action the spring arm 21 is introduced in the direction of arrow 29 into the outer toothing 14 of the control disk 13.

In this position, represented in FIG. 2, the control disk 13 is locked against further rotation of the reeling shaft in the direction of removal 25, while it may rotate in the direction of winding of the safety belt (arrow 30). Accordingly, in the position represented in FIG. 2, the safety belt 12 may be wound onto the reel of the reeling device while even a slight removal of the safety belt results in a blockage of this removable movement.

When it is desired to release the constant activation of the locking mechanism during the subsequent winding of the safety belt, the gear wheel 16 with the switching lug 23, after rotating in the direction of arrow 31 for a predetermined number of revolutions, abuts the switching lug 24 of the gear wheel lug which, during the winding movement of the safety belt in direction of arrow 30, is rotated in the direction of arrow 32. In this position a further rotation of the gear wheel 16 results in a pivoting of the rocker arm 17 in direction of arrow 33, and the switching arm 20 then engages the bottom side of the spring arm 21 and lifts it in direction of arrow 34 away from the outer toothing 14 of the control disk 13. After completion of this movement, the switching position corresponds again to the representation of FIG. 1 in which a normal function of the vehicle-sensitive and the belt-sensitive control system of the reeling device is ensured.

The features disclosed in this description, the claims, the abstract, and the drawings may be used individually or in any desired combination for the realization of the present invention and its various embodiments.

The present invention is, of course, in no way restricted to the specific disclosure of the specification and drawings, but also encompasses any modifications within the scope of the appended claims.

What I claim is:

1. A self-locking reeling device for a safety belt comprising:
    a housing and a reeling shaft connected within said housing;
    a reel for the safety belt connected to said reeling shaft;
    a winding spring acting on said reeling shaft;
    a first gear wheel fixedly connected to said reeling shaft;
    a belt-sensitive and vehicle-sensitive control system for blocking said reeling device in emergency situations, said control system including a control disk with an outer toothing;
    a locking device having a switching arm for locking said control disk when the safety belt has been removed from said reel to a predetermined unwinding stage and for releasing said control disk when the removed safety belt is rewound onto said reel, said locking device including a rocker arm connected to said housing;
    said rocker arm pivotably connected to said housing such that said rocker arm pivots about an axis of said reeling shaft for controlling said switching arm, said rocker arm having a first and a second end and comprising a second gear wheel connected to said first end and a third gear wheel connected to said second end;
    said second gear wheel and said third gear wheel meshing with said first gear wheel: and
    each said first, second, third gear wheels comprising a switching lug which at said predetermined unwinding stage of the safety belt engage one another and pivot said rocker arm due to a pulling force of the safety belt or of said winding spring.

2. A self-locking reeling device according to claim 1, wherein said switching lugs of said gear wheels are positioned outside of a plane of toothing of said gear wheels.

3. A self-locking reeling device according to claim 1, wherein between said first gear wheel and said second and third gear wheels enough play is provided so that said rocker arm can pivot freely.

4. A self-locking reeling device according to claim further comprising a locking arm cooperating with said switching arm such that said locking arm engages said toothing of said control disk for locking said control disk.

5. A self-Locking reeling device according to claim 4, wherein said Locking arm is a spring arm that is loaded in the direction of engagement with said toothing.

* * * * *